United States Patent [19]

Guillot et al.

[11] Patent Number: 5,246,572

[45] Date of Patent: Sep. 21, 1993

[54] REMOVABLE DEMINERALIZATION CARTRIDGE

[75] Inventors: Gerard L. H. Guillot, Radon; Jacky R. P. Fourny, Berus, both of France

[73] Assignee: Moulinex S.A., Bagnolet, France

[21] Appl. No.: 970,493

[22] Filed: Oct. 22, 1992

[30] Foreign Application Priority Data

Oct. 31, 1991 [FR] France .................... 91 13497

[51] Int. Cl.⁵ .................... D06F 75/18; B01D 27/02
[52] U.S. Cl. .................... 210/95; 210/282; 210/266; 210/286; 38/77.8
[58] Field of Search .................... 210/94, 95, 282, 266; 38/77.8, 286

[56] References Cited

U.S. PATENT DOCUMENTS

| | | | |
|---|---|---|---|
| 2,935,194 | 5/1960 | Tomkin | 210/95 |
| 3,372,808 | 3/1968 | Sabo | 210/95 |
| 3,634,229 | 1/1972 | Stanley, Jr. | 210/95 |
| 3,841,484 | 10/1974 | Domnick | 210/95 |
| 4,893,422 | 1/1990 | Mahlich et al. | 210/282 |
| 5,063,697 | 11/1991 | Valente et al. | 210/282 |
| 5,076,912 | 12/1991 | Belz et al. | 210/282 |
| 5,114,570 | 5/1992 | Nelson et al. | 210/282 |
| 5,138,778 | 8/1992 | Brandolini | 210/282 |

FOREIGN PATENT DOCUMENTS

| | | |
|---|---|---|
| 0306623 | 3/1989 | European Pat. Off. |
| 0401535 | 12/1990 | European Pat. Off. |
| 2648163 | 12/1990 | France |
| 2663052 | 12/1991 | France |

Primary Examiner—Stanley S. Silverman
Assistant Examiner—Cynthia L. Nessler
Attorney, Agent, or Firm—Young & Thompson

[57] ABSTRACT

A cartridge (1) for mounting in a water circuit of an apparatus (3) comprises a chamber (6) having a first orifice (4) connected to a liquid reservoir, and a second orifice (5) through which the liquid exits. The chamber also contains a resin (8) for demineralizing the liquid, as well as a state-changing material indicating saturation of the said resin, the chamber having a transparent portion (7) permitting a user to verify a color change. The transparent portion (7) comprises two juxtaposed windows (9 and 10) and a separating partition (11) arranged between the first orifice (4) and the second orifice (5), one end of which terminates at the transparent portion (7) between the two windows (9 and 10) and the other free end of which separated from the peripheral wall delimits, for the liquid, a path of predetermined length so as to permit comparison between the two windows.

9 Claims, 2 Drawing Sheets

REMOVABLE DEMINERALIZATION CARTRIDGE

SUMMARY OF THE INVENTION

The invention concerns removable demineralization cartridges containing resins for demineralizing a liquid, typically water, and more particularly concerns visually evaluating the saturation of the said resins.

A removable demineralization cartridge intended to be mounted in a water circuit of an apparatus includes a chamber which comprises a first opening connected to a liquid resevoir and a second opening through which the liquid escapes after circulating in the said cartridge, and which contains a resin for demineralizing the liquid as well as a state-changing means indicating saturation of the said resin after a predetermined usage time, the said chamber having a peripheral wall comprising a transparent portion for permitting a user to verify a change in color of the state-changing means when the resin is saturated.

To a user, the said color change is not always evident, since it is progressive. The user does not truly know at which moment he should change the demineralization cartridge, which detracts from the usefulness of such a cartridge especially when it is used in an ironing device such as a steam iron where scale develops rapidly.

The object of the invention is to overcome the above-noted disadvantage by providing a removable demineralization cartridge equipped with a means for detecting saturation of the resin which is easy to visualize.

According to the invention, the transparent portion comprises two juxtaposed windows and a separating partition arranged between the first opening and the second opening, one end of which abuts the transparent portion between the two windows and the other free end of which separated from the peripheral wall delimits, for the liquid, a path of a predetermined length so as to permit comparison between the color situated in a region adjacent the first opening and that situated in the region adjacent the second opening.

Thanks to the cartridge according to the invention, the user visualizes on the one hand the progressive change of color of the reagent and on the other hand determines with precision the moment when he should change the cartridge, namely, when the resin is completely saturated. Specifically, the structure of the removable demineralization cartridge is conceived so as to permit assessing the color change by comparison. After passage of a predetermined quantity of liquid through the cartridge, the color appearing in the first window is compared to the color appearing in the second window. If the two colors are similar, the resin of the cartridge is saturated and the cartridge should be changed.

BRIEF DESCRIPTION OF THE DRAWINGS

The characteristics and advantages of the invention will appear more clearly from the description which follows, by way of non-limiting example, with reference to the accompanying drawings in which.

DETAILED DESCRIPTION OF THE PREFERRED EMBODIMENTS

Figure 1:
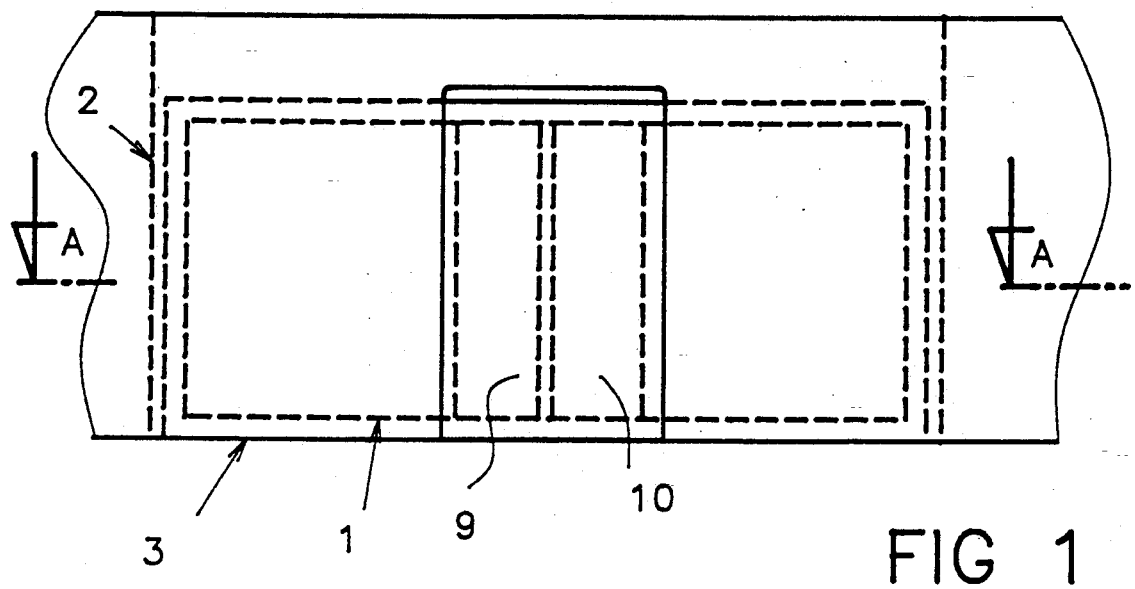
FIG. 1 shows a removable cartridge according to the invention mounted in an ironing device.
Figure 2:
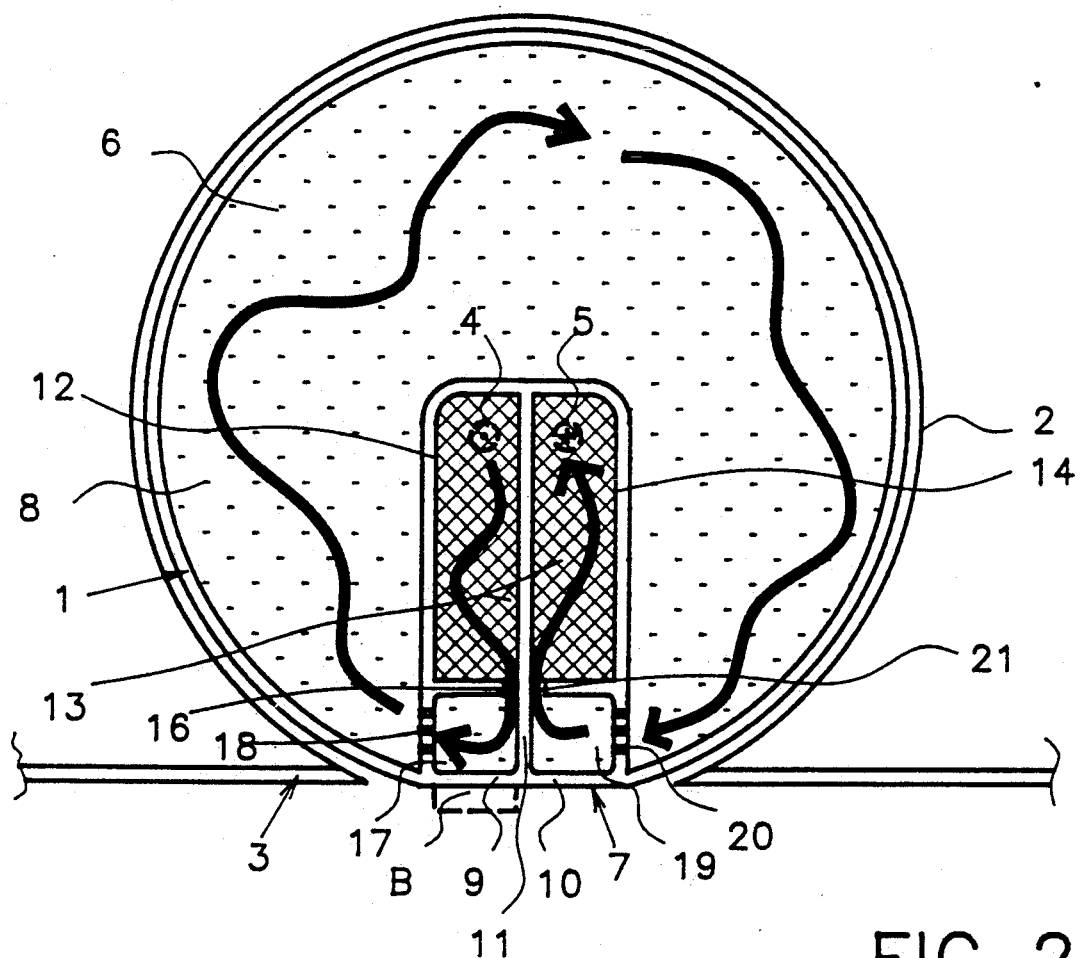
FIG. 2 shows a horizontal section along the line A—A of the removable cartridge shown in FIG. 1 and according to a first embodiment.

According to FIGS. 1 and 2, a removable demineralization cartridge is fixed by fixing means not shown in a housing 2 of a body 3 of an ironing device comprising a water reservoir for supplying a vapor chamber of an iron. The removable cartridge 1 includes a first orifice 4 connected to a reservoir (not shown) of water, typically water, and a second orifice 5 through which the liquid exits after circulation in the cartridge. The removable cartridge 1 also has a chamber 6, for example of circular shape. The chamber 6 comprises, for example on its periphery, a transparent portion 7 and contains a demineralization resin 8 as well as a state-changing means, for example by changing color, such as a reagent, indicating saturation of the resin after a predetermined usage time. The said transparent portion 7 is, for example, planar and situated in the same plane as the outer edge of the independent reservoir 3.

In a particular embodiment shown in FIG. 2, the transparent portion 7 comprises two juxtaposed windows 9 and 10 positioned in the same plane as the said portion 7. The transparent portion 7 also comprises a separating partition 11 arranged between the first orifice 4 and the second orifice 5. The said separating partition 11 terminates at the transparent portion 7 between the two juxtaposed windows 9 and 10. This partition 11 delimits, for the water, paths of a predetermined length one of which is shown by arrows in FIG. 2. The first end of the separating partition 11 is formed interrupted and delimits two compartments 12 and 14 each containing a synthetic foam 13 for retaining impurities and into which terminate the first and second orifices 4 and 5, respectively, which communicate via a first opening 16 of the said first compartment 12 opening on a first case 17 one of whose sides constitutes the first window 9, a second opening 18 of the said first case 17 opening into the said chamber 6 which communicates, via a third opening 20, with a second case 19 one of whose sides constitutes the second window 10, the said second case 19 communicating with the second compartment 14 via a fourth opening 21. The first case 17 and the second case 19 each contain a reagent of the same type, for example a chemical reagent, constituting the state-changing means. In the course of using the ironing device, the chemical reagent contained in the two compartments progressively changes color. The reagent of the first case 17 situated upstream thus assumes a fixed color after a predetermined usage time. The same reagent contained in the second case 19 also changes color, but less rapidly owing to its downstream location. A color comparison between the window 10 of the second case 19 and the window 9 of the first case 17 is effected. When the color of the window 10 of the second case 19 is identical to the color of the window 9 of the first case 17, it is concluded that the resin of the removable cartridge is saturated, and that this removable cartridge 1 must be changed.

In another embodiment, it is possible to substitute for the reagent of the first case 17 a band having predetermined color B (shown in broken lines in FIG. 2) affixed on the outer surface of the first window 9 of the transparent portion 7 of the removable cartridge 1. The color of the band B corresponds to the color of the reagent produced after passing a predetermined quantity of water therethrough. The band of color B is compared to the color of the reagent placed in the second case 19. When the color of the window 10 of the second case 19 is identical to the color band B affixed to the window 9, it is concluded that the resin is saturated and that the removable cartridge must be changed.

Figure 3:
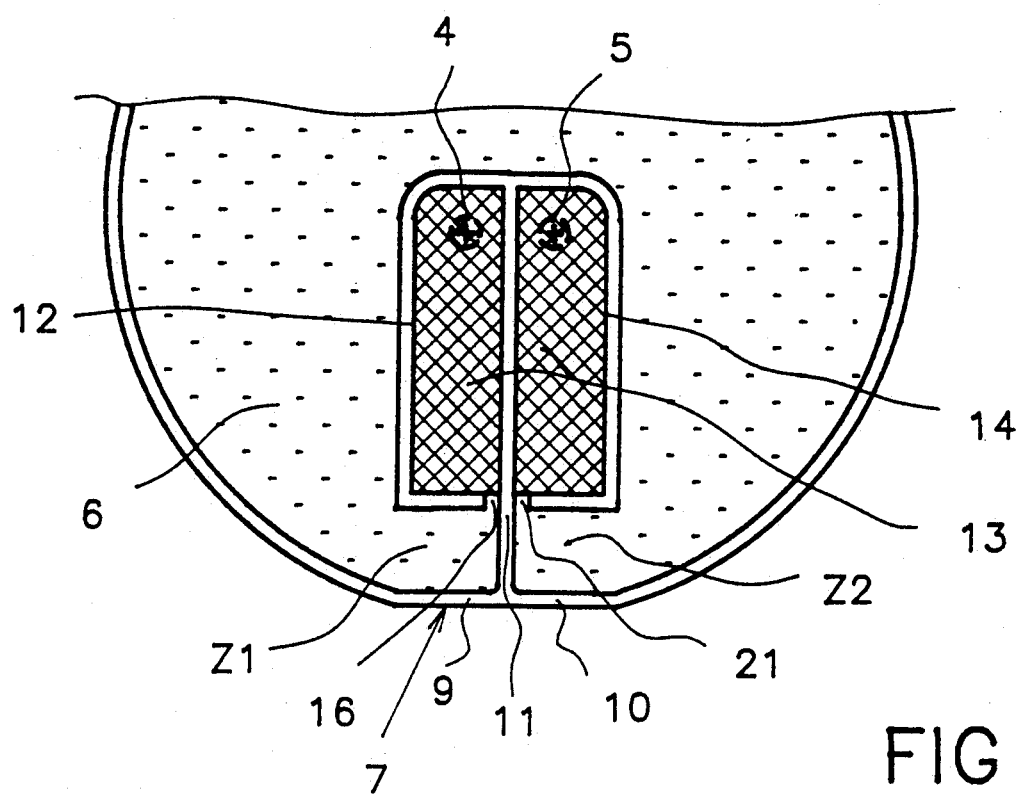
FIG. 3 shows a partial horizontal section along the line A—A of the removable cartridge shown in FIG. 1 and according to a second embodiment.

In another embodiment shown in FIG. 3 and in which the same reference numerals are used for the same parts as in FIG. 1, the free end of the separating partition 11 is formed interrupted and delimits two compartments 12 and 14 which each contain a synthetic foam 13 and in which terminate respectively the first and second orifices 4 and 5, which communicate via a first opening 16 of the said first compartment 12 opening on the said chamber 6 in a first zone $Z_1$ situated between the first window 9 and the first compartment 12, and the said chamber 6 communicating with the second compartment 14 through a second opening 21 opening in a second zone $Z_2$ situated between the second window 10 and the said second compartment 14.

The reagent constituting the state-changing means is mixed with the resin inside the cartridge. After a predetermined usage time, the reagent changes color. A comparison of the color appearing at the windows 9 and 10 is performed. The color change of the reagent appears more rapidly in the first window 9 than in the second window 10, due to its position. When the two colors are identical in the two windows, the resin is saturated and the removable demineralization cartridge 1 must be changed.

Figure 4:
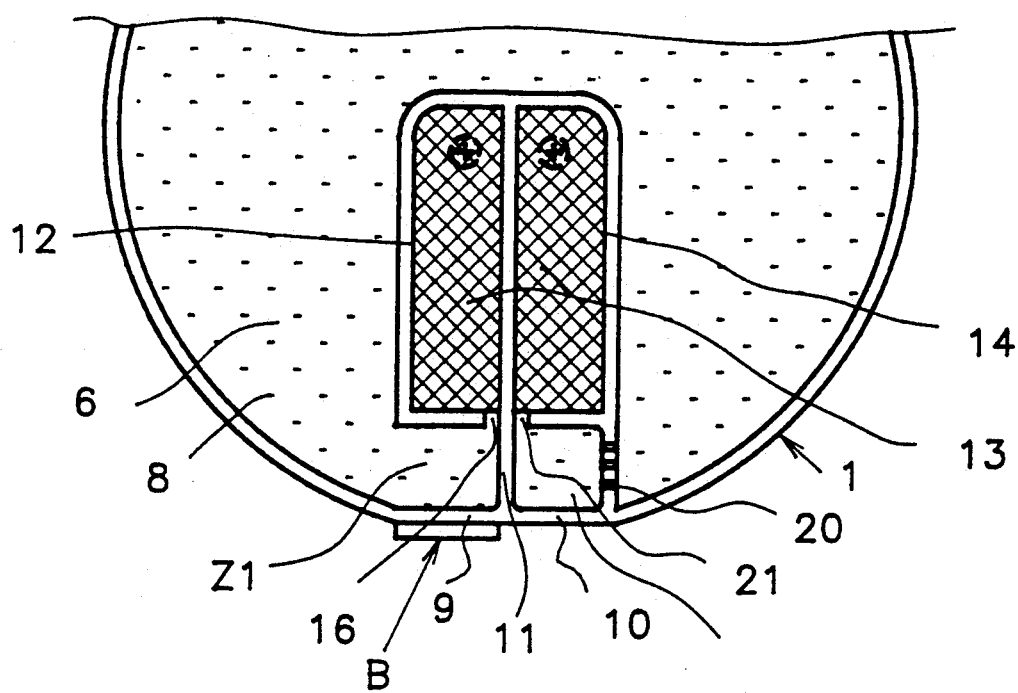
FIG. 4 shows a partial horizontal section along the line A—A of the removable cartridge shown in FIG. 1 and according to a third embodiment.

In another embodiment, shown in FIG. 4, and in which the same reference numerals refer to the same elements as in FIG. 1, the free end of the separating partition 11 is formed interrupted and delimits two compartments 12 and 14 which each contain a synthetic foam 13 and in which terminate respectively the first and second orifices 4 and 5, which communicate via a first opening 16 of the said first compartment 12 opening on the said chamber 6 in a first zone $Z_1$ situated between the first window 9 and the said first compartment 12, the chamber 6 communicating via a third opening 20 with a second compartment 19 one of whose sides constitutes the second window 10, the second case communicating with the second compartment via a fourth opening 21.

A color band B is affixed to the outer surface of the first window 9 and a reagent constituting the state-changing means is positioned in the second case 19. After a predetermined usage time, the reagent of the second case 19 progressively changes color. When the color appearing in the second window 10 is identical to the color band B affixed to the first window 9, the resin of the removable cartridge 1 is saturated and the cartridge 1 must be changed.

The invention may also be applied to any water circuits comprising demineralization cartridges, such as filtration of drinking water, filtration of aquarium water, etc.

What is claimed is:

1. Removable demineralization cartridge for mounting in a water circuit of an apparatus, said cartridge comprising a chamber (6) having a first orifice (4) for connection to a liquid reservoir and a second orifice (5) through which liquid exits, after circulating through the cartridge, said chamber (6) containing a resin (8) for demineralizing a liquid as well as a state-changing means indicating saturation of said resin after a predetermined usage time, said chamber (6) comprising a peripheral wall having a transparent portion (7) permitting a user to verify a change of color of the state-changing means when the resin (8) is saturated, wherein the transparent portion (7) comprises two juxtaposed windows (9 and 10) and a separating partition (11) arranged between the first orifice (4) and the second orifice (5), one end of said partition terminating at the transparent portion (7) between the two windows (9 and 10) and another free end of said partition separated from the peripheral wall delimiting for the liquid a path of a predetermined length, whereby the color situated in a region adjacent the first orifce (4) and that situated in the region adjacent the second orifice (5) may be compared.

2. Removable demineralization cartridge according to claim 1, wherein the free end of the separating partition (11) is formed interrupted and delimits two compartments (12 and 14) each containing a synthetic foam (13) and in which terminate respectively the first and second orifices (4 and 5), which are placed in communication via a first opening (16) of the said first compartment (12) opening on a first case (17) one of whose sides constitutes the first window (9), a second opening (18) of the said first case (17) opening on the said chamber (6) which communicates via a third opening (20) with a second case (19) one of whose sides constitutes the second window (10), the said second case (19) communicating with the second compartment (14) via a fourth opening (21).

3. Removable demineralization cartridge according to claim 2, wherein the first case (17) and the second case (19) contain a chemical reactant constituting the state-changing means.

4. Removable demineralization cartridge according to claim 2, wherein the first case (17) comprises a color band affixed to the outer surface of the first window (9) acting as a reference and the second case (19) contains a reagent constituting the state-changing means.

5. Removable demineralization cartridge according to claim 1, wherein the free end of the separating partition (11) is formed interrupted and delimits two compartments (12 and 14) which contain a synthetic foam (13) and in which terminate respectively the first and second orifices (4 and 5), which are placed in communication by a first opening (16) of said first compartment (12) opening on said chamber (6) in a first zone ($Z_1$) situated between the first window (9) and the said first compartment (12), and said chamber (6) communicating with the second compartment (14) through a second opening (21) opening into a second zone ($Z_2$) situated between the second window (10) and the said second compartment (14).

6. Removable demineralization cartridge according to claim 5, wherein the state-changing means is a chemical reagent mixed with the demineralizing resin (8).

7. Removable demineralization cartridge according to claim 1, wherein the free end of the separating partition (11) is formed interrupted and delimits two compartments (12 and 14) which contain a synthetic foam (13) and in which terminate respectively the first and second orifices (4 and 5), a first opening (16) of said first compartment (12) opening into the said chamber (6) in a first zone ($Z_1$) disposed between the first window (9) and the said first compartment (12), the chamber (6)

communicating via a third opening (20) with a second case (19) one of whose sides forms the second window (10) and the said second case (19) communicating with the second compartment (14) via a fourth opening (21).

8. Removable demineralization cartridge according to claim 7, wherein the first window (9) comprises on its outer surface a color band B serving as a reference, and the second case (19) contains a reagent constituting the state-changing means.

9. Ironing device comprising a water supply reservoir for a vapor chamber, said device comprising a removable demineralization cartridge according to claim 1 in fluid communication with said water supply reservoir.

* * * * *